United States Patent [19]

Matthey

[11] Patent Number: 4,457,193
[45] Date of Patent: Jul. 3, 1984

[54] MACHINE-TOOL COMPRISING TWO OPPOSED COAXIAL SPINDLES

[75] Inventor: Maurice Matthey, Versoix, Switzerland

[73] Assignee: Tarex Machines S.A., Geneva, Switzerland

[21] Appl. No.: 283,545

[22] Filed: Jul. 15, 1981

[30] Foreign Application Priority Data

Jul. 16, 1980 [CH] Switzerland ............ 5445/80

[51] Int. Cl.$^3$ .............................................. B23B 3/30
[52] U.S. Cl. ........................................... 82/3; 82/2.5;
82/36 A; 29/36; 29/564
[58] Field of Search ................. 82/3, 2.5, 2 R, 36 A;
29/36, 564, 568, 37

[56] References Cited

U.S. PATENT DOCUMENTS

| | | | |
|---|---|---|---|
| 1,197,541 | 9/1916 | Potter | 29/36 |
| 2,473,306 | 6/1949 | Schreiber | 82/2.5 |
| 2,534,333 | 12/1950 | Wyrick | 82/36 A |
| 4,070,934 | 1/1978 | Sladdin et al. | 29/36 |

FOREIGN PATENT DOCUMENTS 2846319  4/1979  Fed. Rep. of Germany ....... 82/2 R

Primary Examiner—Leonidas Vlachos
Assistant Examiner—Jerry Kearns
Attorney, Agent, or Firm—Silverman, Cass & Singer, Ltd.

[57] ABSTRACT

Two spindles are provided that are coaxial. The headstock carrying one spindle can move on longitudinal slideways which are parallel to the axis of the spindles. That provides, with a synchronization of the speeds of the spindles to effect the transfer of the workpieces from the chuck of one spindle onto the chuck of the other spindle. A carriage provided with a transversal slideway can move along a pair of longitudinal slideways, parallel to the axis of the two spindles. This carriage carries a frame provided with a revolver-turret-carrying working-tools. The tools of the two revolver-turrets thus can work indifferently the workpieces carried by one and the other of the two spindles.

2 Claims, 4 Drawing Figures

MACHINE-TOOL COMPRISING TWO OPPOSED COAXIAL SPINDLES

BACKGROUND OF THE INVENTION

1. Field of the Invention

The present invention relates to a machine-tool comprising two opposed coaxial spindles intended to receive workpieces. At least one of the spindles is longitudinally movable toward and away from the other. Means are provided to synchronize the spindles at least temporarily so that they rotate at the same speed, but in opposite directions, seen from their front face. The machine-tool provides for the transfer of the workpieces from one of the spindles to the other one.

2. Description of the Prior Art

Such machines are known per se. They have the drawback that their tools are arranged in such a way that they cannot work indifferently on workpieces carried by one or the other of the two spindles.

The purpose of the present invention is to increase the capacity and the flexibility of such machines by arranging them in such a way that their tools are able to work the workpieces no matter which of the two spindles these pieces are placed. Hence, it is possible better to distribute between the two spindles of the machine the operations which are necessary to the realization of a workpiece and, consequently, to reduce to a minimum the total duration of the working and the cost thereof.

The machine-tool according to the invention comprises at least two tool-carrying devices. Each device comprises cross-slideways, one of which is parallel to the axis of the spindles and the other of which is situated in a plane perpendicular to this axis. These devices being arranged in such a way as to be able to cross themselves during their longitudinal displacements, at least in some transversal positions of the elements carrying the tools, so that the tools of the two devices can work indifferently the workpieces carried by one and by the other of the said two spindles.

DESCRIPTION OF THE PREFERRED EMBODIMENT

The drawing shows, by way of example, one embodiment of the invention.

Figure 1:
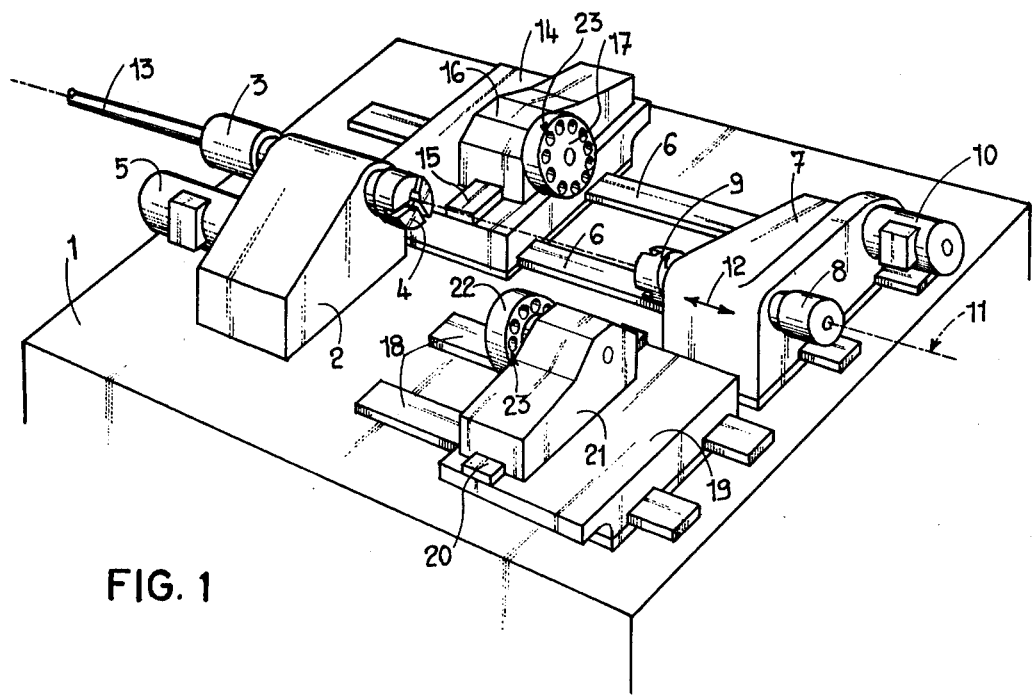
FIG. 1 is a diagrammatic perspective view of a machine-tool having two opposed coaxial spindles.

The machine-tool as represented in FIG. 1 comprises, carried by a stationary frame 1, a stationary head-stock 2 in which is rotatably mounted a spindle 3 which is provided, at one of its ends, with a workpiece-carrying chuck 4. A motor 5 drives the spindle 3.

The frame 1 is provided with a first pair of slideways, 6 arranged parallel to the axis of the spindle 3. On the slideways 6 is mounted a head-stock 7 carrying a spindle 8 provided with a workpiece-carrying chuck 9. A motor 10 drives the spindle 8. The arrangement is such that the two spindles 3 and 8 are coaxial, their commom axis being represented at 11. Moreover, the head-stock 7 is movable along the slideways 6, in the direction of the arrow 12, for movement of move the chuck 9 of the spindle 8 towards and away from the chuck 4 of the spindle 3, to effect a workpiece transfer.

Electronic control means act on the motors 5 and 10 for synchronizing, at least temporarily, the spindles 3 and 8 so that they rotate at the same speed, but an opposite sense, seen from their front face, to transfer the workpieces. The workpieces are provided for instance from a bar 13 passing through the spindle 3, from the chuck 4 onto the chuck 9, at the amount of the cutting of the workpiece in proceeding on the spindle 3. Such electronic control means are known per se. They can, for instance, include two direct current motors 5 and 10 that are each fed through an electronic variator of speed the control voltage that comes from the numerical control of the machine. Each motor includes a tachometer generator the voltage of which is used for correcting the variations of speed of each motor with respect to the desired speed. For synchronizing two motors of this type, it is sufficient to pilot one of them normally and to use, as a control voltage of the second one, the voltage produced by the tachometer generator of the first one.

The slideways 6 carry, beside the head-stock 7, a carriage 14 which, consequently, can move longitudinally, that is to say parallel to the axis 11 of the two spindles, and which is provided with a slideway 15 which is perpendicular to the axis 11, there is provided on slideway 15, for movement transverse of the axis of the spindles, a frame 16 carrying an indexable revolver-turret 17. This revolver-turret is intended to receive working-tools which have not been represented.

The frame 1 carries a second pair of slideways, designated by 18, parallel to the pair of slideways 6, and which, consequently, are parallel to the axis 11 of the two spindles, on which is moved, longitudinally, a carriage 19 provided with a transversal slideway 20, perpendicular to the axis 11 of the two spindles, on which moves a frame 21 provided with an indexable revolver-turret 22 intended to carry working-tools which have not been represented.

Owing to the arrangement as disclosed and represented, the tools carried by the turret 17 can work indifferently the workpieces carried by the chuck 4 of the spindle 3 and the workpieces carried by the chuck 9 of the spindle 8, owing to the fact that the carriage 14 can be moved along slideways 6 so as to be brought opposite the chuck 4 or opposite the chuck 9. The same is true for the tools carried by the turret 22, these tools being able, owing to the slideways 18, to be brought opposite the chuck 4 as well as opposite the chuck 9.

Consequently, the two carriages 14 and 19 can cross themselves, at least in some transversal positions of the two turret-carrying frames 16 and 21. It is understood that, when the two frames 16 and 21 both occupy their most advanced transverse positions, that is to say their positions which are closest to the axis 11 of the two spindles 3 and 8, the crossing of the carriages carrying the frames 16 and 21, during their longitudinal movements, could be impossible, the tools being able, in some special cases, to run into and touch each other.

Owing to the arrangement of the machine such as disclosed and represented, the workpieces on the spindle 3 can be transferred, during their cutting, onto the spindle 8, and the working operations be effected simultaneously on two different workpieces, each carried by one of the spindles. Owing to the fact that the tools of the two turrets 17 and 22 can work anyone of the two workpieces, it is possible, if one of the working operations has, from its own nature, a longer duration than the other ones, to have the tools of the two turrets work simultaneously the same workpiece carried by one of the spindles so as to reduce the duration of this peculiar operation. This possibility to have the tools work indifferently one and the other of the two workpieces gives moreover to the operator a larger liberty in the determination of the order of the working operations and of the way of effecting them, since it gives to the operator the choice, at least for some of these operations, to effect them on one of the spindles or on the other one. Consequently, the operator can decide to transfer onto one spindle some operations which, at first sight, should have to be effected on the other one, that permits to reduce substantially the working times.

Figure 2:
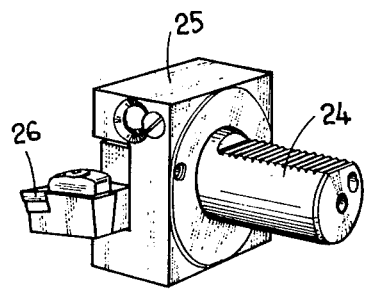
FIG. 2 is a perspective view of a detail, at a larger scale.
Figure 4:
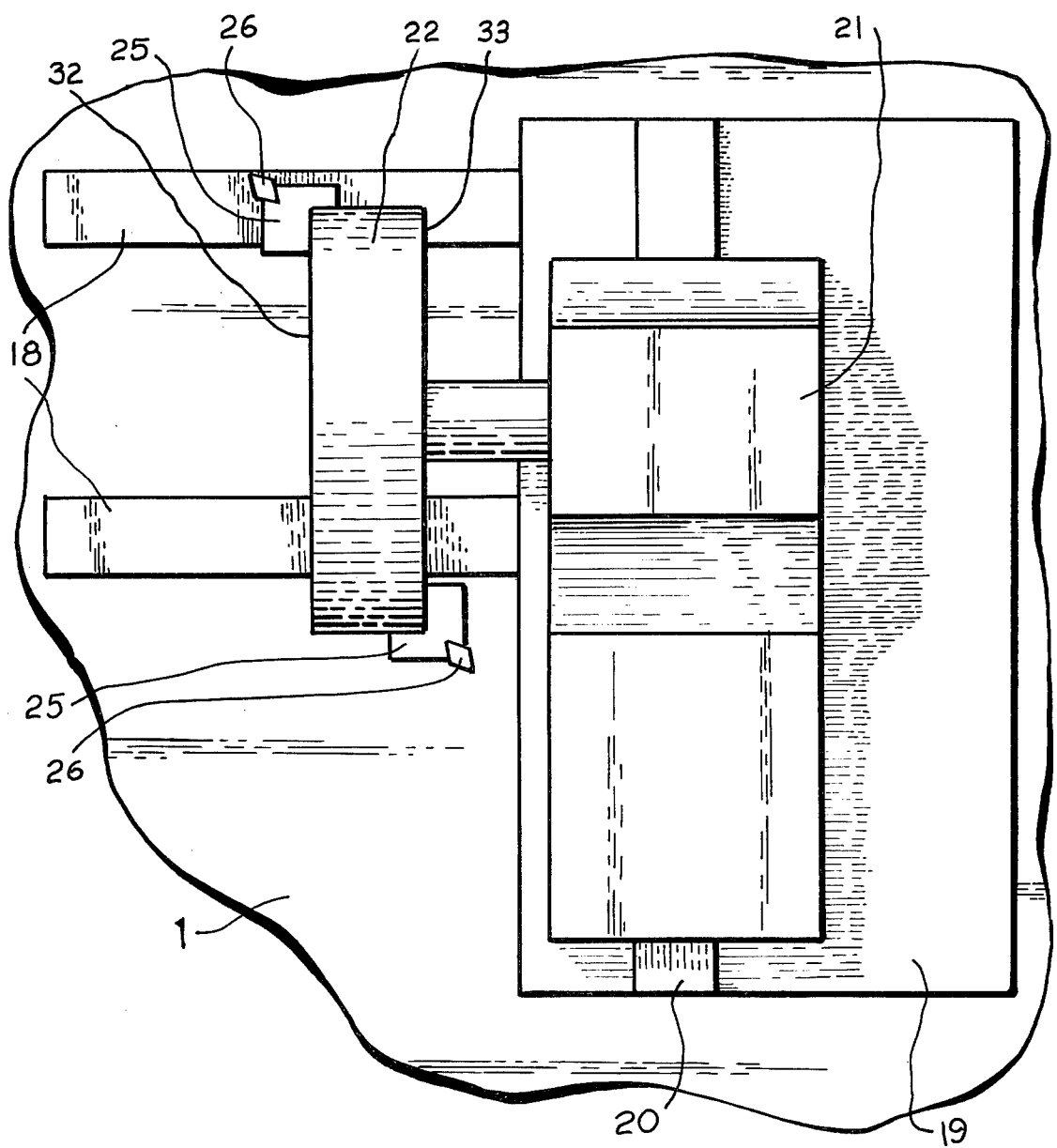
FIG. 4 is a plan view of a portion of the machine-tool showing a work-tool carrying carriage having work-tools mounted on both faces of a turret.

This large flexibility in the use of the machine is still increased due to the fact that the turrets 17 and 22 are arranged in such a way that the tools they carry can be placed indifferently on one or the other of their two faces. To this effect, the two turrets are provided with traversing holes 23 intended to receive the tail 24 of a tool-carrier 25 (FIG. 2) which can engage the holes 23 indifferently by one or the other of their ends. The tool represented in FIG. 2, i.e. a cutter, is designated by 26. In FIG. 4, two tool-carriers 25 are mounted on turret 22, one on each of faces 32 and 33.

Figure 3:
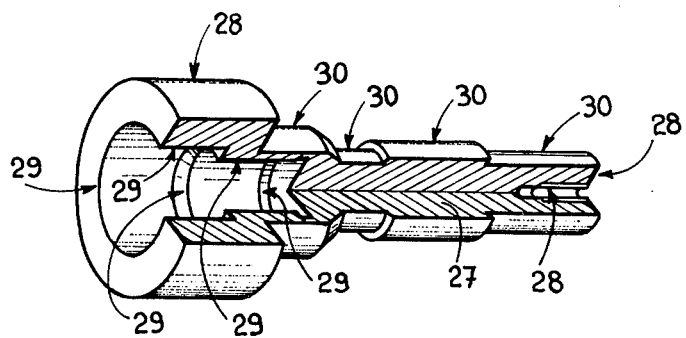
FIG. 3 is a perspective view of a sample of workpiece obtained by means of this machine.

The workpiece 27 represented in FIG. 3 is an example of the working possibilities given by the present machine :

The several surfaces 28 of this workpiece are worked on the spindle 3 by means of the tools of the turret 17 while its several surfaces 29 are worked on the spindle 8 by means of the tools of the turret 22. So far as its surfaces 30 are concerned, they are worked on the spindle 3 simultaneously by means of the tools of the turrets 17 and 22.

It is to be noted that the means providing for production of the longitudinal displacements of the head-stock 7 as well as the longitudinal displacements of the carriages 14 and 19, as well as the transversal displacements of the frames 16 and 21 have not been represented, these means being conventional, well known from people skilled in the art, and being able to consist, for instance, in lead screw mechanisms.

It is also to be noted that the two spindles do not have to be coaxial. One could provide the case where they would be disposed head-to-foot, one coming to grip, on the other one, the workpieces by means of protrusions or recesses of these workpieces eccentric with respect to the axis of the first spindle. This could be the case of half-worked workpieces worked on the present machine-tool in successive stages. In this case, the transfer of the workpieces from one spindle to the other would be effected while the spindles are stopped.

I claim:

1. A machine tool including a pair of spindles mounted in headstocks on a common base and means for rotating each about a common axis, a slideway, at least one of said headstocks being movable along said slideway on said base and means to move said headstock between positions toward and away from said other spindle and supporting at least one workpiece selectively in one, either, or both of said spindles; a pair of rotatable tool carrying indexable tool turrets, one rotatably mounted about an axis on each side of said common axis for said spindles and parallel thereto, each turret including a carriage, a slideway and means for moving said carriage along a path parallel to said common axis, and wherein one of said turret slideways is in common with said headstock slideway, each turret further including a turret frame mounted on said carriage and means for moving said turret frame transverse to said slideway and said carriage to selectively position one or more tools carried by said turrets into selective engagement with a workpiece carried by either or both of said spindles to perform predetermined machining operations thereon, at least one of said turrets including first and second faces with means defining tool supporting openings extending therebetween and configured to receive and support on either or both faces a tool element for selective engagement with said workpiece.

2. The machine-tool of claim 1 further including means for synchronizing the two spindles, at least temporarily, while they are coaxial so that they rotate at the same speed but in opposite directions, seen from their front face, during a transfer of a workpiece from one spindle to the other.

* * * * *